Patented Apr. 27, 1937

2,078,351

UNITED STATES PATENT OFFICE 2,078,351

ASYMMETRIC ARSENO COMPOUNDS

Karl Streitwolf, Frankfort-on-the-Main, Alfred Fehrle, Bad Soden-on-the-Taunus, and Walter Herrmann, Frankfort-on-the-Main, Germany, assignors to Winthrop Chemical Company, Inc., New York, N. Y., a corporation of New York No Drawing. Application October 17, 1932, Serial No. 638,256. In Germany December 12, 1931

3 Claims. (Cl. 260—15)

The present invention relates to asymmetric arseno compounds, more particularly to compounds of the following general formula

wherein X stands for a radical of the pyridine or quinoline group, Y stands for an aryl or arylimidazole radical, which radicals X and Y may be substituted, and Z stands for hydrogen or an alkali metal.

Arsenobenzene derivatives, which are used as a remedy have been transformed into water-soluble preparations of neutral reaction. The compound thus obtained have a good action when intravenously injected, but they are not tolerated when subcutaneously or intramuscularly injected, on account of the very strong irritating effect.

Now we have found that compounds of general application are made by reducing to asymmetric arseno-compounds phenoxy-acetic acid-arsonic acids or aryl-arsonic acids which have an imidazole ring containing the radical of oxy-acetic acid as substituent together with arsonic acids of the pyridine or quinoline group, or by producing the asymmetric arsenobenzenes according to known methods from the derivatives of the corresponding arsonic acids containing trivalent arsenic, or by converting a corresponding asymmetric arseno compound containing hydroxyl into an asymmetric arseno compound containing an oxy-acetic acid radical by reaction with monochloracetic acid.

These new compounds have, as is required in modern therapy, a good action when intravenously, subcutaneously or intramuscularly injected and are well tolerated.

The following examples illustrate the invention.

1. 16.7 grams of 4-acetylamino-2-phenoxy-acetic acid-1-arsonic acid and 11 grams of 2-pyridone-5-arsonic acid are dissolved in 800 cc. of hot water. To the solution, having a temperature of 65° C., there are added 30 cc. of hypophosphorous acid of 50% strength and 1 cc. of hydriodic acid (specific gravity 1.7). The whole is kept for half an hour at 60°–70° C. and then cooled; the yellow precipitate which dissolves in sodium bicarbonate to a clear solution, is separated by filtration, washed with water, and in moist condition dissolved in 100 cc. of methyl alcohol of 60% strength and about 12 cc. of 3 N-sodium carbonate solution; the solution is treated with acetic acid until its reaction is feebly acid to litmus paper, filtered and introduced, while stirring, into ten times its weight of alcohol and ether. The precipitate is filtered by suction and washed with alcohol and ether. The substance forms a yellow powder which readily dissolves in water to a clear solution; when heated it chars without melting. It has the following formula:

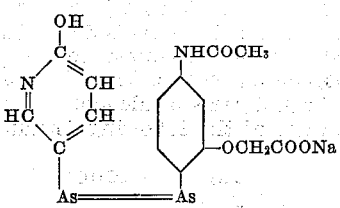

The yield amounts to 20 grams.

2. 8.3 grams of 3-acetylamino-4-phenoxyacetic acid-1-arsonic acid and 7.4 grams of 2-hydroxy-3-bromopyridine-5-arsonic acid are dissolved in 43.5 cc. of water and 43.5 cc. of 2N-caustic soda solution; the whole is mixed with 250 cc. of water and, after 98 grams of sodium hydrosulfite have been added, heated for 1½ hours at 65° C. The sodim salt of the arseno compond separates. The separation is completed by cooling. The mass is then filtered by suction, dissolved by addition of 100 cc. of methyl alcohol and 150 cc. of water together with about 6 cc. of 3N-sodium carbonate solution; the substance is precipitated by introducing the solution, while stirring, into 2.5 liters of acetone; it is filtered by suction and washed with acetone and ether. 11 grams of a yellow powder are obtained; it dissolves in water to a clear solution. It has the following formula:

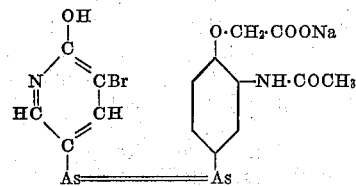

The product has the same properties as the preparation obtained according to Example 1.

3. 1.65 grams of 1-methyl-2-oxyacetic acid-benzimidazole-5-arsonic acid, obtainable by causing 1-methyl-benzimidazolone-5-arsonic acid to react with monochloracetic acid, and 1.1 grams of 2-pyridone-5-arsonic acid are dissolved in 30 cc. of water; the solution is reduced with 3 cc. of hypophosphorous acid of 50% strength and 0.2 cc. of hydriodic acid (specific gravity 1.7) and worked up as indicated in Example 1. It has the following formula:

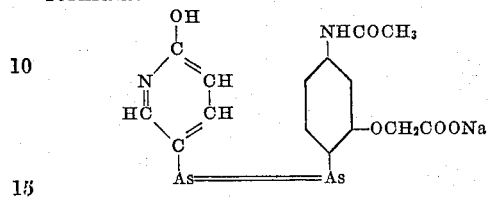

The substance has the properties described in the said example.

4. 16.7 grams of 4-acetylamino-2-phenoxyacetic acid-1-arsonic acid and 14 grams of 2,8-dimethylquinoline-5-arsonic acid, obtainable by causing 4-methyl-3-aminophenyl-1-arsonic acid to react with crotonaldehyde in the presence of nitrobenzene and hydrochloric acid, are mixed with 20 grams of sodium acetate and 12 grams of potassium iodide; the mixture is introduced into 180 cc. of glacial acetic acid which has been heated to 70° C. and mixed with 30 cc. of hypophosphorous acid of 50% strength. The temperature rises to 80° C. After 10 minutes the mass is poured into 1.2 liters of water and caustic soda solution is added to the clear orange solution until the reaction to Congo paper has ceased. The precipitate is filtered by suction, washed and triturated with 100 cc. of water and 200 cc. of methyl alcohol; the mass is dissolved by addition of 3N-sodium carbonate solution and the solution is poured into 10 times its volume of a mixture of equal parts of alcohol and ether. An orange powder of the following formula:

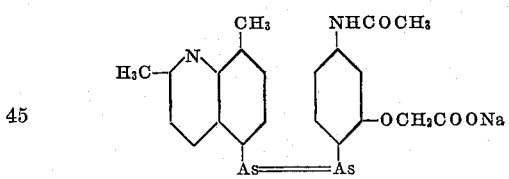

is obtained which dissolves in water to a clear solution.

5. 16.7 grams of 3-acetylamino-4-phenoxyacetic acid-1-arsonic acid and 16.4 grams of 7-nitro-8-hydroxy-2-methylquinoline-5-arsonic acid, obtainable by causing 3-amino-4-hydroxy-5-nitrobenzene-1-arsonic acid to react with crotonaldehyde in the presence of nitrobenzene and hydrochloric acid, are dissolved in 500 cc. of water and 75 cc. of 2N-caustic soda solution. 300 grams of sodium hydrosulfite are added thereto and the whole is heated for 1 hour at 65° C. After cooling, the brown precipitate is filtered by suction, dissolved in 500 cc. of water with addition of caustic soda solution and stirred for half an hour together with 20 grams of acetic anhydride. The arseno compound begins to separate; it contains in the quinoline nucleus a 7-acetylamino group. By addition of dilute hydrochloric acid until the reaction is acid to Congo paper the separation is completed; the product is filtered by suction, washed and transformed into the sodium salt, as described in the preceding examples. Instead of the 7-nitro-8-hydroxy-2-methylquinolinearsonic acid, there may also be used as parent material the equivalent quantity of the corresponding 7-amino compound. The substance forms a yellowish-brown powder which easily dissolves in water. It has the following formula:

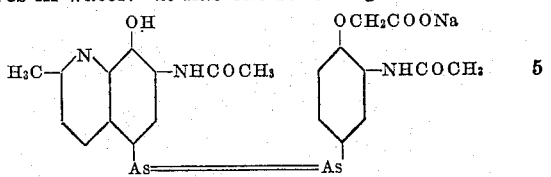

When heated it chars without melting.

6. 8.4 grams of 1-methyl-2-oxyacetic acid-benzimidazole-5-arsonic acid and 5.8 grams of 2-pyridone-5-arsonic acid are dissolved in 75 cc. of water together with 6 cc. of caustic soda solution of 40° Bé. To this solution there is added 0.5 gram of silver powder and a solution of 28 grams of formaldehyde sodium sulfoxylate in 75 cc. of water, the whole is heated to 60° C. and, at this temperature, 14 cc. of 5N-hydrochloric acid are introduced drop by drop in the course of half an hour, while stirring. The arseno compound separates in the form of a yellow precipitate; it is cooled to 45° C., 6 cc. of 5N-hydrochloric acid are added, the mass is filtered by suction and washed with water. The precipitate is dissolved in methyl alcohol of 50% strength with addition of sodium carbonate and precipitated by pouring the solution into a mixture of alcohol and ether. The substance is a yellow powder which dissolves in water to a neutral solution. The compound is identical with the product of Example 3. The yield amounts to 7.8 grams.

We claim:

1. The asymmetric arseno compounds of the following formula:

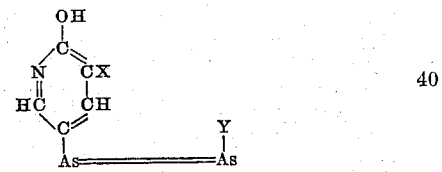

whereas X stands for a member of the group consisting of hydrogen and halogen, and Y stands for a member of the group consisting of

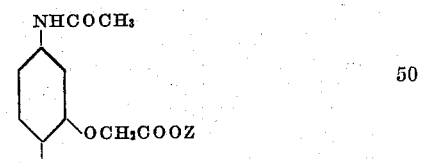

and

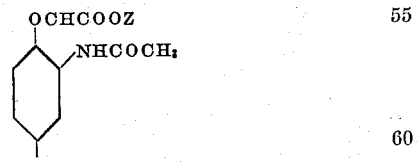

wherein Z stands for a member of the group consisting of hydrogen and the alkali metals, said compounds being in the form of their alkali salts readily soluble in water to neutral solutions of good efficacy and tolerability when administered intravenously, subcutaneously or intramuscularly.

2. The compound of the following formula:

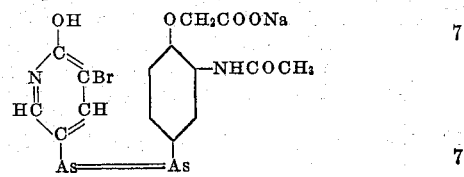

said compound being a yellow powder which readily dissolves in water to a neutral solution of good efficacy and tolerability when administered intravenously, subcutaneously or intramuscularly.

3. The compound of the following formula

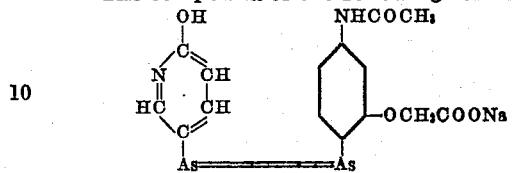

said compound being a yellow powder which readily dissolves in water to a neutral solution of good efficacy and tolerability when administered intravenously, subcutaneously or intramuscularly.

KARL STREITWOLF.
ALFRED FEHRLE.
WALTER HERRMANN.